United States Patent
Raut

(10) Patent No.: US 10,728,150 B2
(45) Date of Patent: Jul. 28, 2020

(54) METHOD AND SYSTEM SEGREGATING APPLICATION TRAFFIC IN A WIDE AREA NETWORK

(71) Applicant: Arista Networks, Inc., Santa Clara, CA (US)

(72) Inventor: Devendra Raut, Cupertino, CA (US)

(73) Assignee: Arista Networks, Inc., Santa Clara, CA (US)

( * ) Notice: Subject to any disclaimer, the term of this patent is extended or adjusted under 35 U.S.C. 154(b) by 78 days.

(21) Appl. No.: 15/943,075

(22) Filed: Apr. 2, 2018

(65) Prior Publication Data
US 2019/0306059 A1 Oct. 3, 2019

(51) Int. Cl.
*H04L 12/26* (2006.01)
*H04L 12/741* (2013.01)
*H04L 12/723* (2013.01)

(52) U.S. Cl.
CPC ............ *H04L 45/745* (2013.01); *H04L 45/50* (2013.01); *H04L 43/028* (2013.01)

(58) Field of Classification Search
CPC ................................. H04L 12/56; H04L 45/04
See application file for complete search history.

(56) References Cited

U.S. PATENT DOCUMENTS

| | | | | |
|---|---|---|---|---|
| 10,057,162 B1* | 8/2018 | Singh | ...................... | H04L 45/66 |
| 2012/0147894 A1* | 6/2012 | Mulligan | ............ | G06F 9/45533 |
| | | | | 370/395.53 |
| 2013/0054763 A1* | 2/2013 | Van der Merwe | ...... | H04W 8/12 |
| | | | | 709/220 |
| 2015/0039210 A1* | 2/2015 | Ahn | .................... | G01C 21/3492 |
| | | | | 701/117 |
| 2016/0080972 A1* | 3/2016 | Ni | .......................... | H04W 8/22 |
| | | | | 370/229 |

OTHER PUBLICATIONS

Bates, Tony, et al., "BGP Route Reflection: An Alternative to Full Mesh Internal BGP (IBGP)", retrieved at https://tools.etf.org/html/rfc4456, Apr. 2006. (13 pages).
Rosen, Eric C., et al., "BGP/MPLS IP Virtual Private Networks (VPNs)", retrieved at https://tools.ietf.org/html/rfc4364, Feb. 2006. (48 pages).

* cited by examiner

*Primary Examiner* — Abdelillah Elmejjarmi
(74) *Attorney, Agent, or Firm* — Chamberlain, Hrdlicka, White, Williams & Aughtry

(57) ABSTRACT

In general, embodiments of the invention relate to a system and method for configuring and managing a network. More specifically, embodiments of the invention relate to segregating traffic in a network based on application domains. Further, embodiments of the invention provide a mechanism to efficiently implement traffic segregation in a network using application domain specific virtual routing and forwarding (VRF) tables.

20 Claims, 8 Drawing Sheets

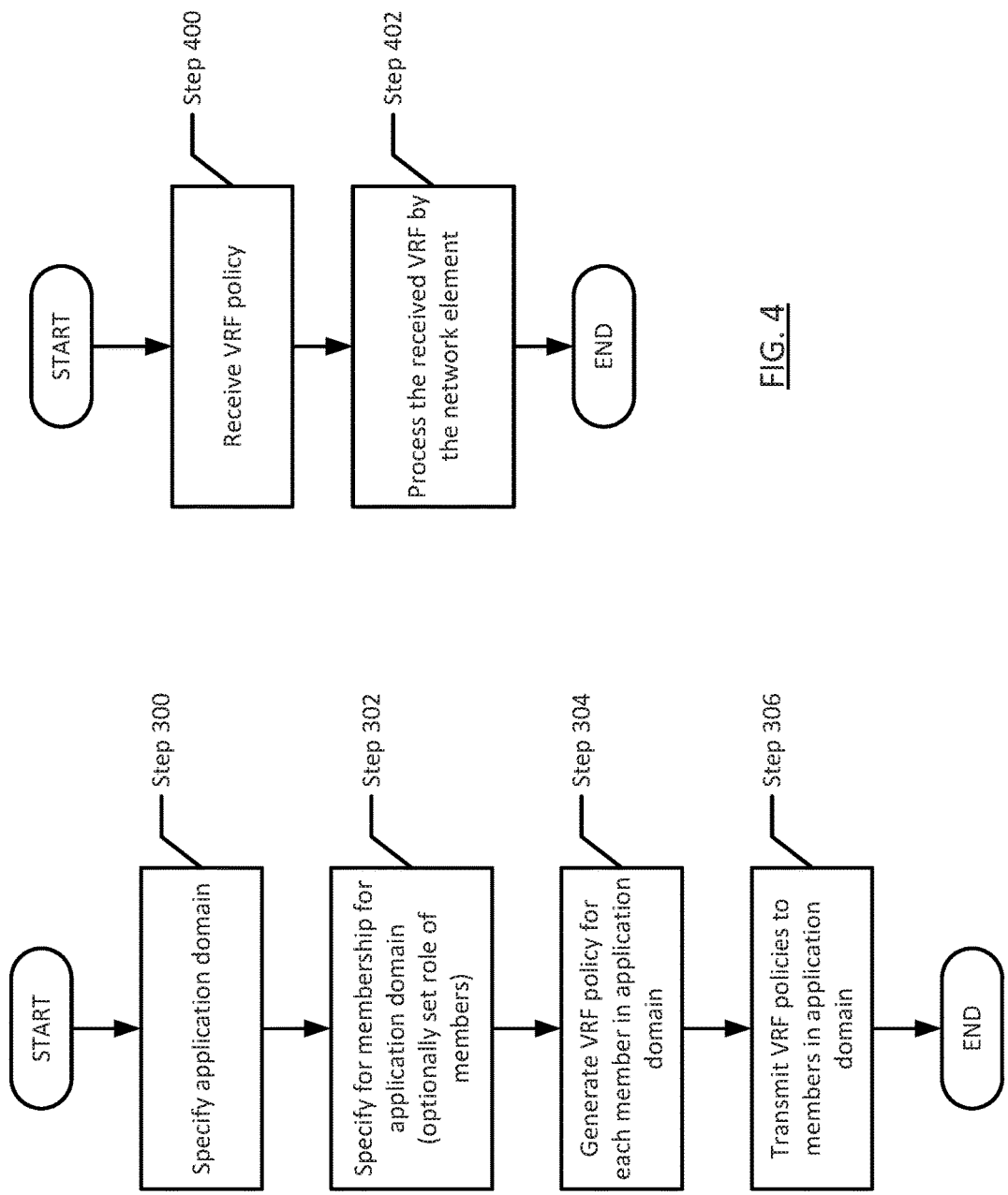

METHOD AND SYSTEM SEGREGATING APPLICATION TRAFFIC IN A WIDE AREA NETWORK

BACKGROUND

Various mechanisms are used to route and/or forward traffic within a network. Network resources are required to implement these mechanisms. As the size and complexity of the network increases, the management resources and network resources required to implement the aforementioned mechanisms may limit the ability to scale the network effectively beyond a certain size.

SUMMARY

In general, in one aspect, the invention relates to a method for managing traffic in a network. The method includes receiving, by a network element, a packet from a computing device, determining an application domain associated with the packet, processing the packet using a virtual routing and forwarding (VRF) table that is specific to an application domain, wherein the network element comprises a plurality of VRF tables, wherein each VRF table is associated with a different application domain; and transmitting, based by on the processing, the packet towards a second network element.

In general, in one aspect, the invention relates to a non-transitory computer readable medium (CRM) comprising computer readable program code, which when executed by a processor, enables the processor to: receive, by a network element, a packet from a computing device, determine an application domain associated with the packet, process the packet using a virtual routing and forwarding (VRF) table that is specific to an application domain, wherein the network element comprises a plurality of VRF tables, wherein each VRF table is associated with a different application domain, and transmit, based by on the processing, the packet towards a second network element.

In general, in one aspect, the invention relates to a system for processing managing traffic in a network. The system includes a network element, comprising a processor, persistent storage, and memory, and configured to: receive a packet from a computing device, determine an application domain associated with the packet, wherein determining the application domain associated with the packet comprises performing packet inspection on the packet to determine an application executing on the computing device from which the packet was issued, wherein the application is associated with the application domain, process the packet using a virtual routing and forwarding (VRF) table that is specific to an application domain, wherein the network element comprises a plurality of VRF tables, wherein each VRF table is associated with a different application domain, and transmit, based by on the processing, the packet towards a second network element.

Other aspects of the invention will be apparent from the following description and the appended claims.

BRIEF DESCRIPTION OF DRAWINGS

FIG. 3 shows a method for generating VRF policies in accordance with one or more embodiments of the invention.

FIG. 4 shows a method for processing VRF policies by a network element in accordance with one or more embodiments of the invention.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-8B, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to a system and method for configuring and managing a network. More specifically, embodiments of the invention relate to segregating traffic in a network based on application domains. Further, embodiments of the invention provide a mechanism to efficiently implement traffic segregation in a network using application domain specific virtual routing and forwarding (VRF) tables.

Figure 1:
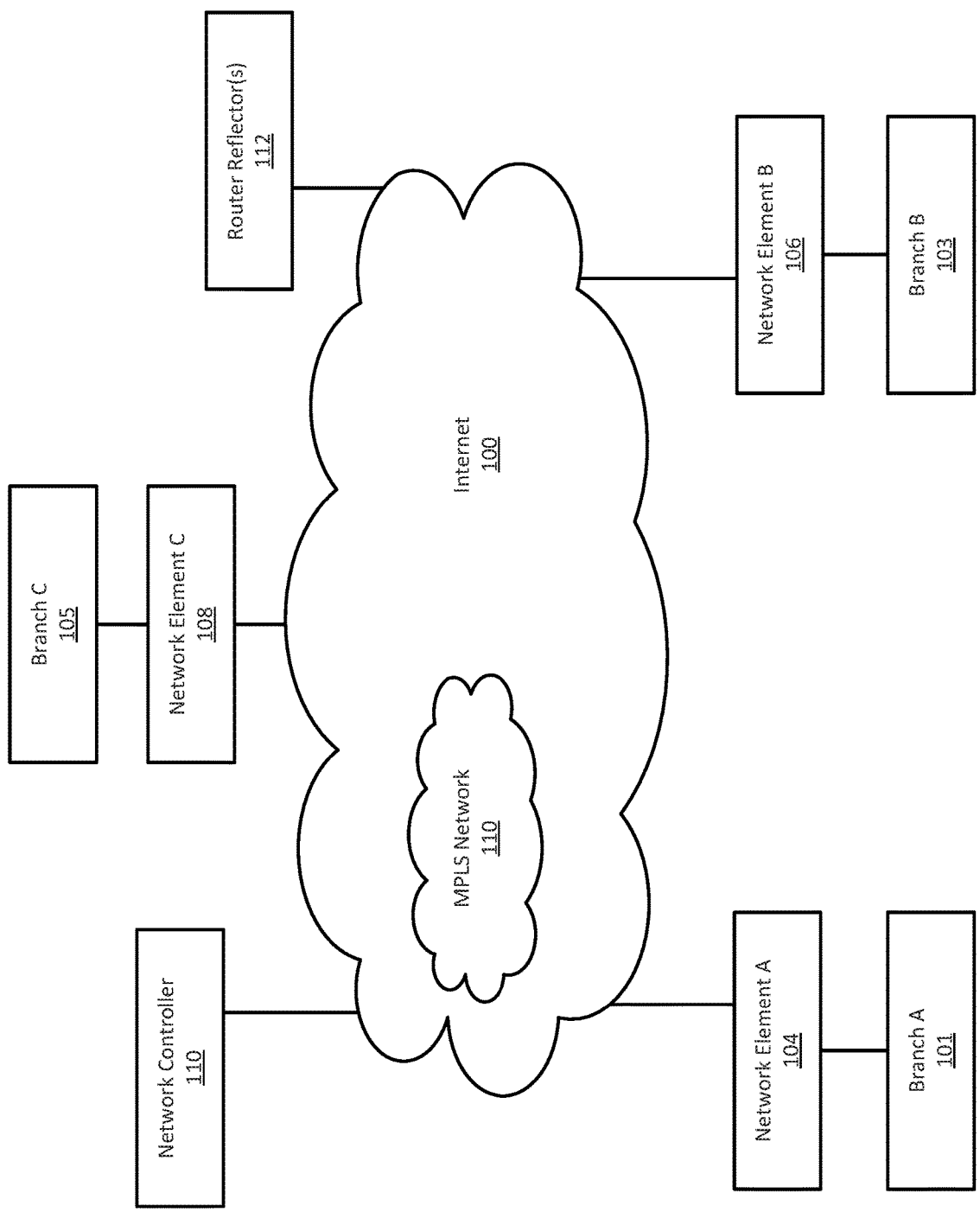
FIG. 1 shows a system in accordance with one or more embodiments of the invention.

FIG. 1 shows a system in accordance with one or more embodiments of the invention. The system includes one or more network elements (104, 106, 108) operatively connected through a multiprotocol label switching (MPLS) network (114), multiple Internet (100) connections, a network controller (110) and a route reflector (112). The system further includes branches (101, 103, 105), each of which may be directly connected to one or more network elements (104, 106, 108). Each of these components is described below.

In one embodiment of the invention, a network element (104, 106, 108) may be a physical device that includes persistent storage, memory (e.g., random access memory (RAM), shared memory), one or more processor(s) (e.g., integrated circuits) (including a switch chip or network processor)), and two or more physical network interfaces or ports. The switch chip or network processor may be hardware that determines out of which egress port on the network element (104, 106, 108) to forward media access control (MAC) frames. The switch chip or network processor may include egress and ingress ports that may connect to the physical network interfaces or ports on the network element (104, 106, 108). Further, each physical network interface or port may or may not be connected to a (e.g., 101, 103, 105), to another network element (104, 106, 108) in the MPLS network (110), or to other network components (not shown) in the MPLS network or the Internet (100). A network element (104, 106, 108) may be configured to receive network packets (also referred to as packets or frames) via the network interfaces or ports, and determine whether to: (i) drop the network packet; (ii) process the network packet in accordance with one or more embodiments of the invention; and/or (iii) send the network packet, based on the processing, out another network interface or port on the network element (104, 106, 108) in accordance with one or more embodiments of the invention.

In one embodiment of the invention, the persistent storage on a network element (104, 106, 108) may include any type of non-transitory computer readable medium that includes instructions, which, when executed by the one or more processor(s), enable the network element (104, 106, 108) to perform any of the functionalities described below in FIGS. 4-6 and may also include functionality to implement the MPLS and Border Gateway Protocol (BGP). The functionality of the network elements is not limited to the aforementioned examples. Examples of a network element (104, 106, 108) include, but are not limited to, a switch, a router, and a multilayer switch. A network element (104, 106, 108) is not limited to the aforementioned specific examples. Additional detail about one or more embodiments of network element is described below in FIG. 2.

In one embodiment of the invention, the MPLS Network (110) may be a set of interconnected network elements or systems (not shown), which operatively connect the one or more network element(s) (104, 106, 108) o. The MPLS Network (110) includes functionality to facilitate communications between these aforementioned components using the MPLS protocol. The MPLS Network (110) may include any combination of local area network (LAN) and/or wide area network (WAN) segments, such as the Internet (100), which may employ any combination of wired and/or wireless connections and communication protocols.

In one embodiment, the network controller (110) builds and maintains the state information from each of the network elements. For each network element, the state information may include, but is not limited to, VRF policies (described below), configuration information, the current state of the various VRF tables on the network controller, and any other information that may be used to configure and/or manage the network element. In one or more embodiments of the invention, the network controller (110) may be implemented as a computing device (see e.g., FIG. 7), a network element, or another type of device that can store the state information for network element and communicate (directly or indirectly) with the network elements in the MPLS network (114). In one embodiment of the invention, the network controller includes functionality to perform the method shown in FIG. 3.

In one embodiment of the invention, the route reflector (112) is configured to receive routes from one or more network elements (e.g., 104, 106, 108) and to forward the received routes to the other network elements (e.g., 104, 106, 108). The route reflector may perform the aforementioned functionality in accordance with RFC 4456 (BGP Route Reflection: An Alternative to Full Mesh Internal BGP (IBGP), 2006). In one or more embodiments of the invention, the route reflector (112) may be implemented as a computing device (see e.g., FIG. 7), a network element, or another type of device that can perform the aforementioned functionality and communicate (directly or indirectly) with the network elements in the MPLS network (114).

While FIG. 1 shows a configuration of components, other system configurations may be used without departing from the scope of the invention.

Figure 2:
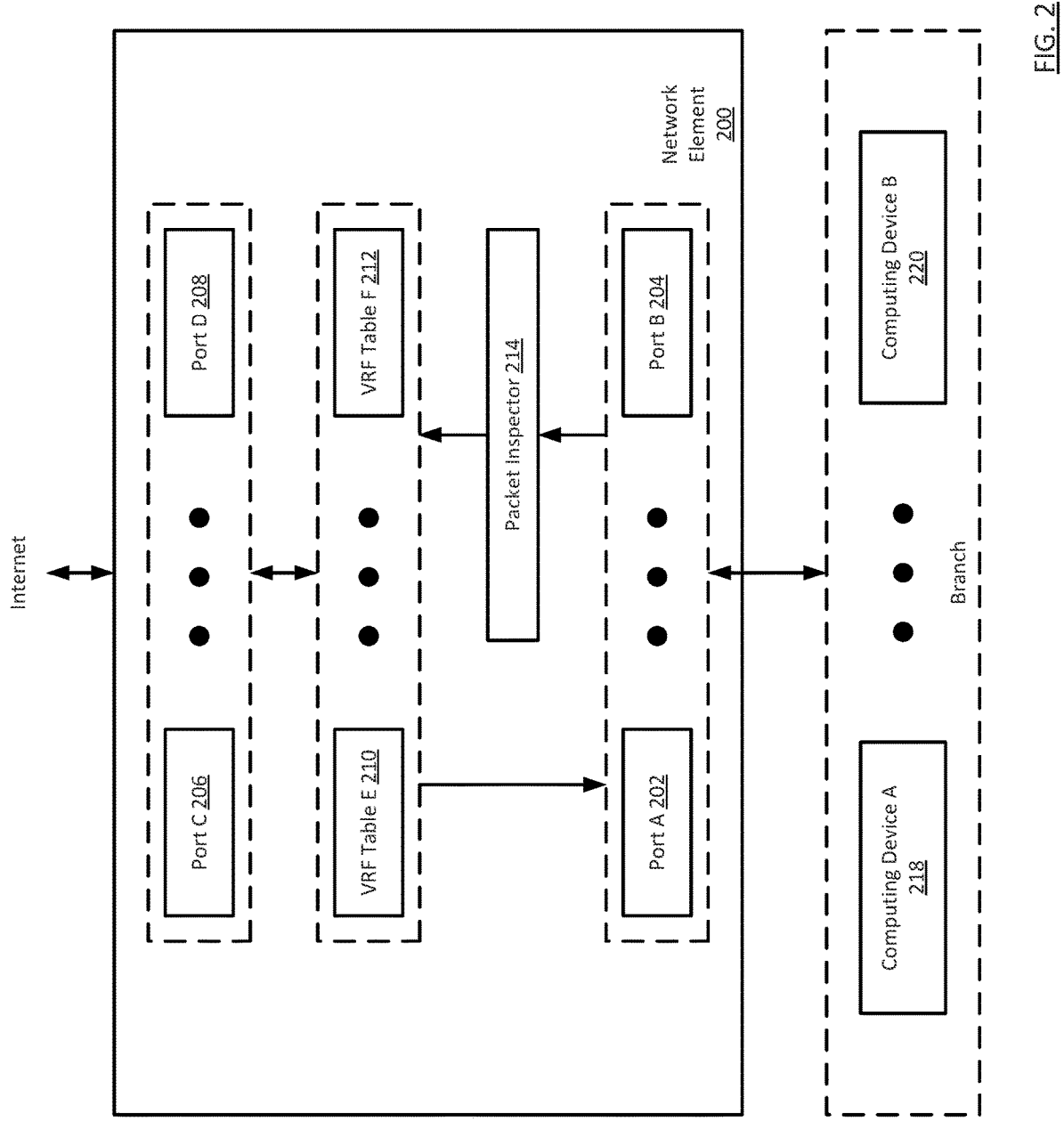
FIG. 2 shows a network element in accordance with one or more embodiments of the invention.

FIG. 2 shows a network element in accordance with one or more embodiments of the invention. The network element (200) includes a series of ports (e.g., 202-206), one or more application domain specific VRF tables (210, 212), and a packet inspector (214). Each of these components is described below.

In one embodiment of the invention, each port (202-206) is a physical interface that connects the network element (200) to the Internet (100) or to an element in a branch (216). The elements in the branch may include other network elements (not shown) and/or computing devices (see e.g., FIG. 7).

In one embodiment of the invention, the network element (200) includes one or more VRF tables for each application domain. In one embodiment of the invention, an application domain is a set of network elements that are configured to transmit packets between computing devices executing instances of the same application. For example, referring to FIG. 1, consider a scenario in which a first computing device in Branch A (101) is executing a first instance of application 1 and a second computing device in Branch B (103) is executing the second instance of application 1, where the data, is shared and/or communicated between the first and second instances of application 1. In this scenario, network element A (104) and network element B (106) are members of an application domain, where the application domain is specific to application 1. Continuing with the example, the first computing device in Branch A (101) is also executing a first instance of application 2 and a first computing device in Branch C (105) is executing the second instance of application 2, where the data is shared and/or communicated between the first and second instances of application 2. In this scenario, network element A (104) and network element C (108) are members of a second application domain, where the second application domain is specific to application 2.

In one embodiment of the invention, the packet inspector (214), which may be implemented in hardware, software, or any combination thereof, includes functionality to inspect packets received (directly or indirectly) from computing devices in a branch (216). The packet inspector (214) is configured to inspect the received packets in order to determine the application domain with which the packet is associated. The packet inspector may make the aforementioned determination by inspecting the header(s) and/or the data (also referred to as the payload) in the packet. The packet inspector, in one or more embodiments of the invention, may use any currently available or later discovered method for packet inspection (or deep packet inspection) in order to determine the application domain with which the packet is associated. The determination of the application domain may correspond to determining the application (or application instance) which issued the packet.

FIGS. 3-6 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3-6 may be performed in parallel with any other steps shown in FIGS. 3-6 without departing from the scope of the invention.

FIG. 3 shows a method for generating import/export policies in accordance with one or more embodiments of the invention. The method shown in FIG. 3 may be performed, for example, by a network controller. Alternatively, the method shown in FIG. 3 may be performed by another computing device (see e.g., FIG. 7). In such scenarios, the VRF policies generated as a result of method shown in FIG. 3 may be provided to the network controller, which, in turn, may distribute the VRF policies to the appropriate network elements.

Turning to FIG. 3, in step 300, an application domain is specified. The specification of the application domain may include obtaining and/or generating an identifier the uniquely identifies the application domain. The identifier may be any combination of alpha, numeric, alphanumeric, or special characters (or symbols) without departing from the invention. Aforementioned identifier does not need to be a globally unique identifier; rather, the identifier uniquely identifies the application domain from all other application domains managed by the network controller.

In step 302, the membership for the application domain is specified. The specification of the membership may include specifying which network elements (e.g., 106, 106, 108) are part of the application domain. In addition, step 302 may also include specifying a role for each of the members. For example, if the network elements in the domain are to be a configured using a hub and spoke topology, then one of the network elements may be specified with a role of hub and the remaining network elements may be specified as spokes. For purposes of the invention, the topology specified in step 302 corresponds to how new routes are propagated/distributed between the network elements within the application domain. If no roles are specified (i.e., no explicit topology is specified for the network elements in the application domain), then a default topology is used for the network element. The default topology may be full mesh topology (i.e., each network element distributes/propagates all is locally learned routes to all other network elements). A different default topology may be used without departing from the invention.

In step 304, a VRF policy is generated for each member (i.e., network element) in the application domain. Each VRF policy specifies an import policy and/or an export policy for the application domain specific VRF table on the network element. The import policy specifies the route target(s) used for importing received routes to the application domain specific VRF table. Similarly, the export policy specifies the route target(s) to associate with locally-learned routes in the application domain specific VRF table, prior to the locally-learned routes being transmitted to the route reflector.

Those skilled in the art will appreciate that the VRF policies generated in step 304 may be the same or different for each network element in the application domain.

In step 306, each VRF policy is transmitted to the corresponding network element in the application domain.

FIG. 4 shows a method for processing new routes by a network element in accordance with one or more embodiments of the invention. The method shown in FIG. 4 may be performed by each network element upon receipt of a VRF policy. Turning to FIG. 4, in step 400, the VRF policy is received from the network controller.

In step 402, the VRF policy is processed by the network element. The processing of the VRF policy may include one or more of the following:

(i) Processing Initially Received VRF Policy—In scenarios in which the VRF policy to be processed is the first VRF policy received from the network controller, the processing of the VRF policy may include: (a) creating an application domain specific VRF table for each application domain specified in the VRF policy and (b) for each created VRF table, associating one or more route targets, where the route targets are based on the VRF policy (see Example below); and (ii) Processing Subsequently Initially Received VRF Policy—In scenarios in which the VRF policy to be processed is not the first VRF policy received from the network controller, the processing of the VRF policy may include: (a) creating an application domain specific VRF table for each application domain specified in the VRF policy that is not already present on the network controller (i.e., this may occur when the network controller becomes a member of a new or existing application domain) and (b) for each newly created (or previously existing) VRF table, associating one or more route targets, where the route targets are based on the VRF policy; and (c) removing application domain specific VRF tables when the VRF policy indicates explicitly or implicitly) that the network element is no longer part of the an application domain(s) (See Example below).

Figure 5:
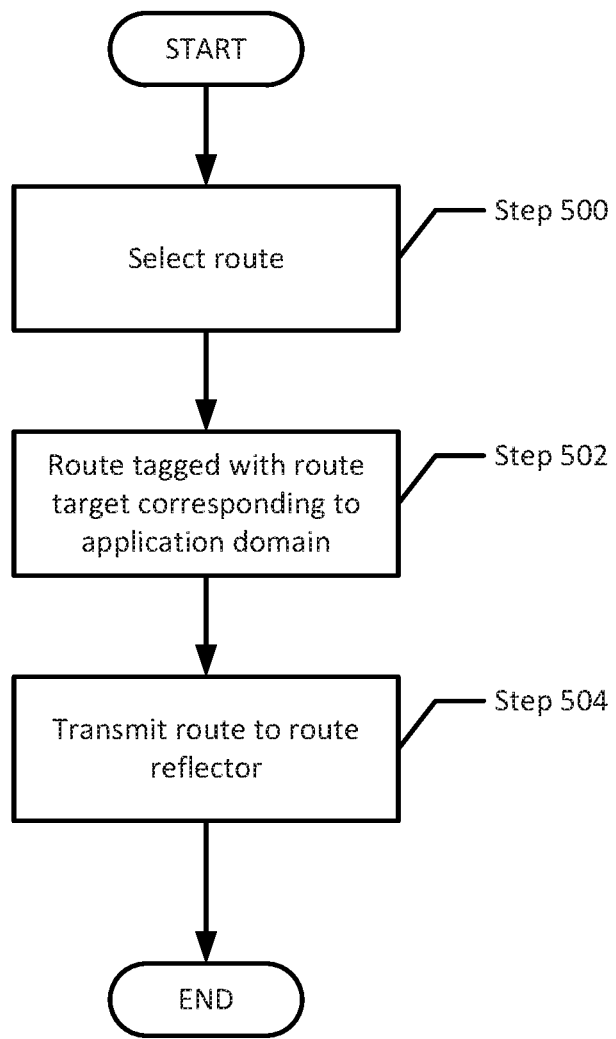
FIG. 5 shows a method for processing new routes by a network element in accordance with one or more embodiments of the invention.

FIG. 5 shows a method for processing new routes by a network element in accordance with one or more embodiments of the invention. The method shown in FIG. 5 is performed by network elements when a new locally-learned route is added to an application domain specific VRF table. In one embodiment of the invention, the network element includes functionality to learn routes from the branch (or more specifically, to learn routes from network elements and/or computing devices in the branch). Further, because a given network element may be associated with multiple application domains, the network element includes functionality to determine the application domain specific VRF table in which to store the locally-learned routes.

Turning to FIG. 5, in step 500, a route in an application domain specific VRF table is selected for processing. The route may correspond to a locally-learned route that has not been previously processed in accordance with FIG. 5.

In step 502, the route is then tagged with the one or more route targets. As discussed above, the network element receives VRF policies from the network controller, where each VRF policy specifies route targets for importing and exporting routes. The tagging of the route in step 502 uses the route target(s) in the export policy (which is a portion of the VRF policy) associated with the application domain. In certain embodiments of the invention, the route targets are associated with the corresponding VRF tables based on the VRF policy (see e.g., FIG. 4). Accordingly, when a route is selected from a given VRF table, the route is tagged with a route target(s) that was previously associated with the VRF table.

In step 504, the tagged route is transmitted to the route reflector.

Those skilled in the art will appreciate network element may aggregate a set of tagged routes to send to the route reflector instead of sending individual tagged routes to the route reflector.

Figure 6:
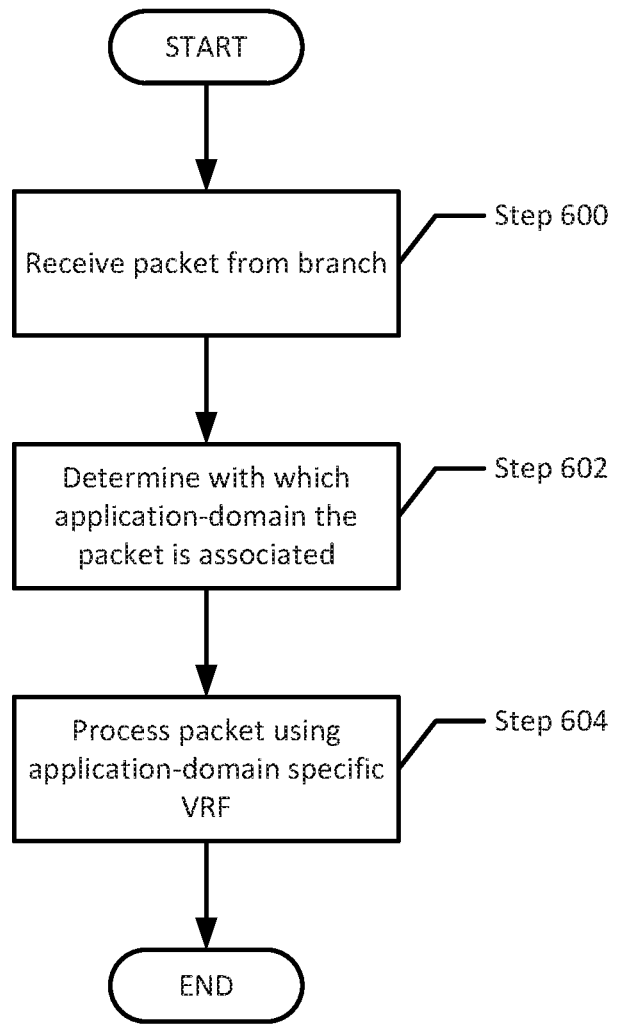
FIG. 6 shows a flowchart for processing packets in accordance with one or more embodiments of the invention.

FIG. 6 shows a flowchart for processing packets in accordance with one or more embodiments of the invention. The method shown in FIG. 6 may be performed by the network element when the network element receives packets from the branch (or, more specifically, from a network element or computing device in the branch).

Turning to FIG. 6, in step 600, a packet is received from the branch (or, more specifically, from a network element or computing device in the branch). The packet may include a header(s) and a payload.

In step 602, the packet inspector inspects the packet using one or more packet inspection methods or deep-packet inspection methods (as described above). The result of the packet inspection is identification of the application (or application instance) that issued by the packet. The application may be used to identify an application or, alternatively, the application may correspond directly to an application domain.

In step 604, the packet is subsequently processed using the application domain specific VRF table, where the application domain specific VRF table is selected based on the identification of the application domain in step 602. The processing of the packet may include determining how to route the packet towards its destination. For example, referring to FIG. 1, if the packet originated at Branch A and its destination is a computing device in Branch B, then the processing of the packet may include routing and/or forwarding the packet from network element A towards network element B. The result of step 604 is either (i) dropping the packet, because the destination of the packet is not part of the application domain (i.e., there is no route in the application domain specific VRF table for the destination and, as such, the destination is not reachable using the aforementioned VRF table) or (ii) packet is transmitted out of a port (e.g., Port C, Port D in FIG. 2) towards another network element in the MPLS network or Internet depending on the configured Quality of Service (QoS) policy for the application domain. In one or more embodiment of the invention, the packet, as part of the processing, may be updated to include an attribute (or other information), which specifies the application domain with which the packet is associated.

Though not shown in FIG. 6, when a packet is received from the MPLS network or Internet by the network element the packet is received via port C or port D), the packet is processed using the appropriate application domain specific VRF table. Accordingly, the network element includes functionality to inspect (or otherwise process) the received packet in order to determine the appropriate application domain specific VRF table. The identification of the appropriate application domain specific VRF table may include using an attribute (or other information) associated with the received packet in order to identify the appropriate application domain specific VRF. The received packet is subsequently processed by the application domain specific VRF table.

Figure 7:
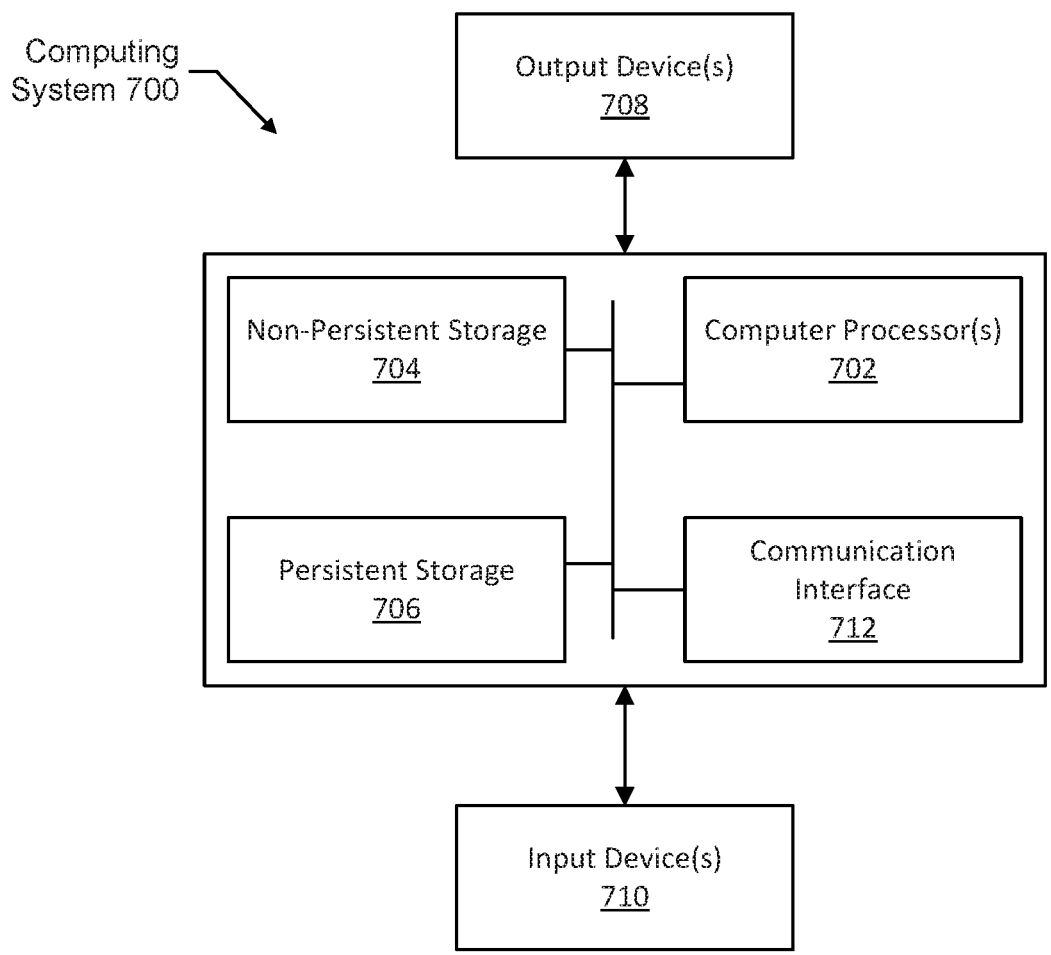
FIG. 7 shows a computing device in accordance with one or more embodiments of the invention.

FIG. 7 shows a computing system in accordance with one or more embodiments of the invention. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), one or more communication modules (712) (e.g., Bluetooth module, infrared module, network module (which may be wired or wireless), cellular module (e.g., an module that supports one or more cellular data communication protocols), optical module, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication module (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

In one embodiment of the invention, the computing device (700) may any type of system (e.g., software and computer hardware) that is configured to generate, send, receive, and/or process requests and replies either locally or over a network using software and computer hardware. The computing device (700) may include functionality to generate, receive, and/or transmit MAC frames. Examples of a computing devices (700) may include, but are not limited to, a server (e.g., a database server, a dynamic host configuration protocol (DHCP) server, an application server, a file server, a print server, a mail server, or any other server), a desktop computer, a mobile device (e.g., a laptop computer, a smart phone, a personal digital assistant, a tablet computer, or any other mobile device), or any other type of computing device with the aforementioned minimum requirements.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention (including the embodiments described above in the example use case).

Example

Figure 8A:
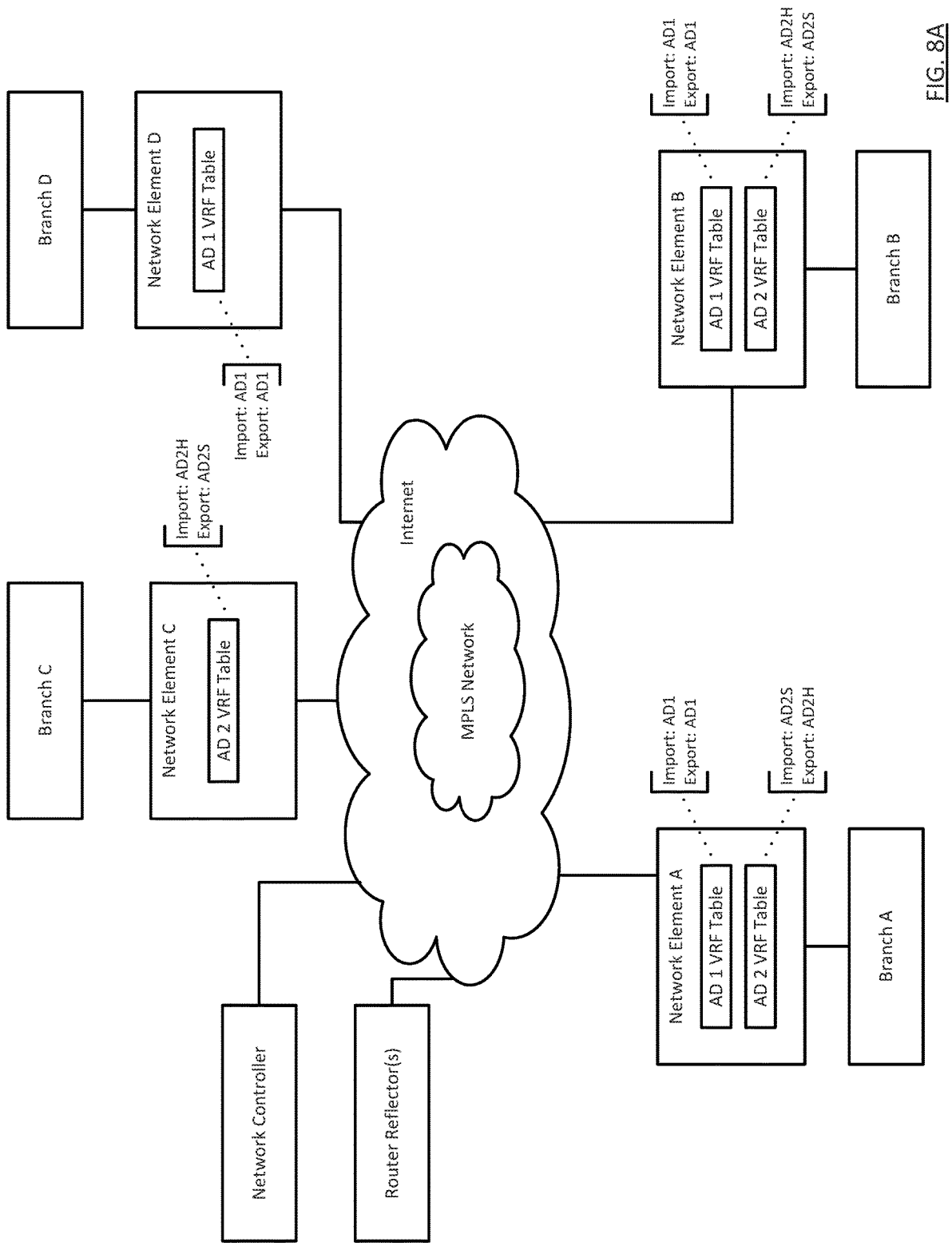
FIGS. 8A and 8B show an example in accordance with one or more embodiments of the invention.
Figure 8B:
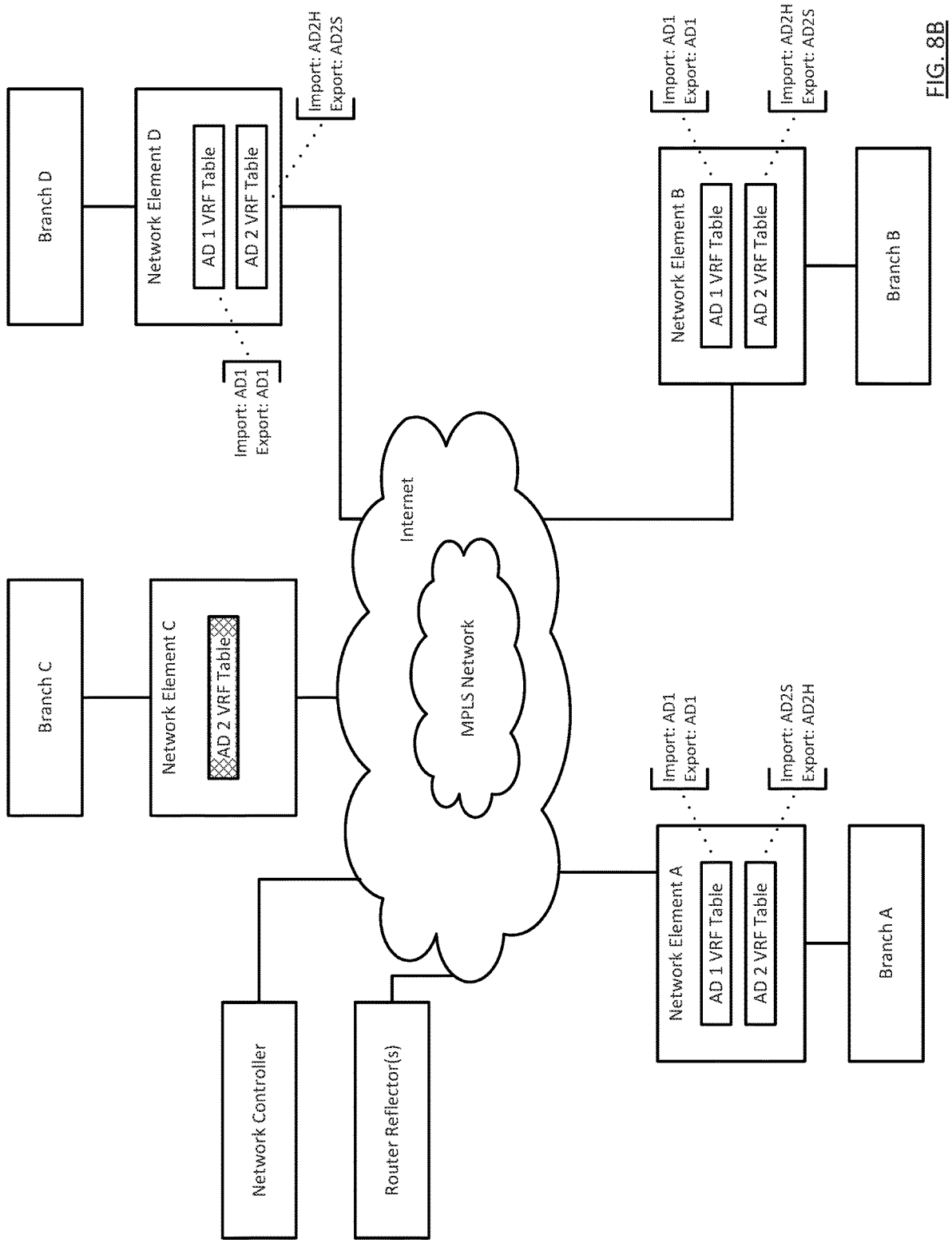

FIGS. 8A and 8B show an example in accordance with one or more embodiments of the invention. The example is not intended to limit the scope of the invention.

Consider a scenario in which there are four branches (Branch A, Branch B, Branch C, and Branch D) each connected to a network element (network element A, network element B, network element C, network element D), where each of the network elements is part of an MPLS network or connected to the Internet.

In this scenario assume that there are two application domains: (i) Application Domain 1 (AD1) and Application Domain 2 (AD2). The network controller, in accordance with FIG. 3, obtains the following information for the aforementioned application domains: AD1: members [Network Element A, Network Element B, Network Element C]; AD2: members [Network Element A (Role: Hub), Network Element B (Role: Spoke), Network Element D (Role: Spoke)].

Based on the aforementioned information, the network controller generates the following VRF policies: (i) VRF Policy for AD1 for Network Element A; (ii) VRF Policy for AD1 for Network Element B; and (iii) VRF Policy for AD1 for Network Element D; (iv) VRF Policy for AD2 for Network Element A; (v) VRF Policy for AD2 for Network Element B; and (vi) VRF Policy for AD2 for Network Element C. As shown in FIG. 8A, each of the aforementioned VRF policies includes an import policy and an export policy. The route targets includes in the VRF policies are based, at least in part, on the topology of the members in each of the application domains. Specifically, the members in AD1 are arranged in a full mesh topology (i.e., the default topology in this example), while the members in AD2 are arranged in a hub and spoke topology (based, at least in part, on the role specified for each member).

The VRF policies are subsequently transmitted to the network elements. In this scenario, a VRF table is created for each VRF policy received by the network element. For example, two application domain specific VRF tables are created on network element A (i.e., AD 1 VRF table, AD 2 VRF table). Each of the VRF tables are then associated with the route targets specified in the corresponding VRF policies. For example, for AD 1 VRF table on network element A, AD1 is specified as the route target for all exported routes and AD1 is specified as the route target for all imported routes. Accordingly, based on the aforementioned routing targets, network element A will import into AD 1 VRF table all received routes with a route target of AD1. Further, the network element will tag, prior to export, all locally-learned routes in AD 1 VRF table. Once tagged, network element A will transmit the tagged routes to the route reflector.

Once the aforementioned VRF tables have been created on each of the network elements, the packets may be routed between the network elements using the VRF tables as described in FIG. 6. Further, the routes may be distributed between network elements using the route reflector as described in FIG. 5. In the instance example, the application domain specific VRF tables enforce which branches may communicate with each other on a per application domain basis using the application domain specific VRF table. Accordingly, if the network element does not include an application specific VRF table for a given application domain, then it is not able to communicate with other network elements with respect to that application domain. For example, Branch A may only communicate with Branch C when the packets are associated with application domain 2 (AD2), while Branch A may only communicate with Branch D when the packets are associated with application domain 1 (AD1).

Referring to FIG. 8B, consider a scenario in which the membership for AD2 is updated to remove network element C and add network element D, with a role of spoke. In response to this change in membership, the network controller: (a) instructs network element C to delete (or other stop using) AD 2 VRF table for processing packets received from Branch C; (b) instructs all other network elements that include an application domain specific VRF table for AD2 to remove all routes related to branch C from their application domain specific VRF table for AD2, and (c) generates and sends a VRF policy to network element D, where the VRF policy is generated using the role of spoke. In this example (as well as in other embodiments of the invention), the application domain membership (including addition and deletion of members) is controlled/managed using import/export policies generated and distributed by the network controller.

In response to receiving the VRF policy, AD 2 VRF table is created and associated with route target specifies in the VRF policy (i.e., Import: AD2H, Export:AD2S). Once AD 2 VRF table has been created, network element D may update the content of AD 2 VRF table with locally-learned routes from Branch D and based on the aforementioned import policy associated with AD 2 VRF table. Further, new routes in AD 2 VRF table may be exported with AD2S as the route target. Finally, based on the aforementioned updated to the application domain specific VRF tables, network element C may no longer receive or transmit packets related to application domain 2 (AD2).

Embodiments of the invention may offer a variety of advantages. For example, one or more embodiments of the invention provide a mechanism to efficiently segregate network traffic at the application-level using a network controller and application-specific VRF policies. Further, one or more embodiments of the invention provide an efficient mechanism to update network traffic segregation policies (e.g., updating which branches may communicate with each other, see e.g., FIG. 8B) using a network controller. In this manner, administrators do not need to manually configure each of the network elements; rather, the configuration may be automatically pushed to the network elements in response to an update in the membership of an application domain.

By segregating or isolating network traffic using one more embodiments of the invention, the surface area for potential attacks is reduced because there is isolation at the data plane and at the control plane level. Further, by segregating or isolating network traffic using one more embodiments of the invention, packet processing policies related to, for example, QoS and load balancing, may be more easily implemented across an entire network infrastructure.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims,

What is claimed is:

1. A method for managing traffic in a network, comprising:
generating, by a network controller, a first virtual routing and forwarding (VRF) policy for a network element and a second VRF policy for a second network element, wherein the first VRF policy and the second VRF policy are associated with an application domain;
transmitting, by the network controller, the first VRF policy to the network element and the second VRF policy to the second network element, wherein the network element and the second network element are members of the application domain;

generating, by the network controller, a third VRF policy for a third network element and a fourth VRF policy for the network element, wherein the third VRF policy and the fourth VRF policy are associated with a second application domain;

transmitting the third VRF policy to the third network element and the fourth VRF policy to the network element, wherein the network element and the third network element are members of the second application domain;

receiving, by the network element, a packet from a computing device;

determining that the packet received by the network element is associated with the application domain;

processing the packet using a table,
  wherein the network element comprises the VRF table and a second VRF table,
  wherein the VRF table is generated using the first VRF policy, and
  wherein the second VRF table is generated using the fourth VRF policy; and transmitting, based on the processing, the packet towards the second network element.

2. The method of claim 1, further comprising:
updating, on the network element, a local VRF policy using the first VRF policy to obtain an updated local VRF policy;
receiving, by the network element, a new route; and
importing, based on the updated local VRF policy, the new route to the VRF table.

3. The method of claim 1, wherein the first VRF policy comprises at least one selected from a group consisting an import policy and an export policy.

4. The method of claim 2,
wherein the new route is received from a route reflector,
wherein the new route specifies a route target,
wherein the route target is associated with at least the VRF table, and
wherein the importing of the new route to at least the VRF table is based, at least in part, on the route target.

5. The method of claim 1, further comprising:
identifying, by the network element, a new route in the VRF table;
associating a route target with the new route to obtain a tagged route, wherein the route target corresponds to an export policy associated with the VRF table; and
transmitting the tagged route to a route reflector.

6. The method of claim 1, wherein determining the application domain associated with the packet comprises performing packet inspection on the packet to determine an application executing on the computing device from which the packet was issued, wherein the application is associated with the application domain.

7. The method of claim 1, wherein the network element is one selected from a group consisting of a switch, a router, and a multilayer switch.

8. The method of claim 1, wherein the network element and the second network element are operatively connected over a multiprotocol label switching (MPLS) network.

9. A non-transitory computer readable medium (CRM) comprising computer readable program code, which when executed by a processor, enables the processor to:
generate, by a network controller, a first virtual routing and forwarding (VRF) policy for a network element and a second VRF policy for a second network element, wherein the first VRF policy and the second VRF policy are associated with an application domain;

transmit, by the network controller, the first VRF policy to the network element and the second VRF policy to the second network element, wherein the network element and the second network element are members of the application domain;

generate, by the network controller, a third VRF policy for a third network element and a fourth VRF policy for the network element, wherein the third VRF policy and the fourth VRF policy are associated with a second application domain;

transmit the third VRF policy to the third network element and the fourth VRF policy to the network element, wherein the network element and the third network element are members of the second application domain;

receive, by the network element, a packet from a computing device;

determine that the packet received by the network element is associated with the application domain;

process the packet using a VRF table,
  wherein the network element comprises the VRF table and a second VRF table,
  wherein the VRF table is generated using the first VRF policy, and
  wherein the second VRF table is generated using the fourth VRF policy; and transmit, based on the processing, the packet towards the second network element.

10. The non-transitory CRM of claim 9, further comprising additional computer readable program code, which when executed by the processor, further enables the processor to:
update, on the network element, a local VRF policy using the VRF policy to obtain an updated local VRF policy;
receive, by the network element, a new route; and
import, based on the updated local VRF policy, the new route to the VRF table.

11. The non-transitory CRM of claim 9, wherein the first VRF policy comprises at least one selected from a group consisting an import policy and an export policy.

12. The non-transitory CRM of claim 9, wherein determining the application domain associated with the packet comprises performing packet inspection on the packet to determine an application executing on the computing device from which the packet was issued, wherein the application is associated with the application domain.

13. A system for processing managing traffic in a network, the system comprising:
a network element, comprising a processor, persistent storage, and memory, and configured to:
  generate, by a network controller, a first virtual routing and forwarding (VRF) policy for a network element and a second VRF policy for a second network element, wherein the first VRF policy and the second VRF policy are associated with an application domain;
  transmit, by the network controller, the first VRF policy to the network element and the second VRF policy to the second network element, wherein the network element and the second network element are members of the application domain;
  generate, by the network controller, a third VRF policy for a third network element and a fourth VRF policy for the network element, wherein the third VRF policy and the fourth VRF policy are associated with a second application domain;

transmit the third VRF policy to the third network element and the fourth VRF policy to the network element, wherein the network element and the third network element are members of the second application domain;
receive, by the network element, a packet from a computing device;
determine that the packet received by the network element is associated with the application domain;
process the packet using a VRF table,
wherein the network element comprises the VRF table and a second VRF table,
wherein the VRF table is generated using the first VRF policy, and
wherein the second VRF table is generated using the fourth VRF policy; and
transmit, based on the processing, the packet towards the second network element.

14. The system of claim 13,
wherein the network element is one selected from a group consisting of a switch, a router, and a multilayer switch; and
wherein the network element and the second network element are operatively connected over a multiprotocol label switching (MPLS) network.

15. The system of claim 13, wherein the network element is further configured to:
identify a new route in the VRF table;
associate a route target with the new route to obtain a tagged route, wherein the route target corresponds to an export policy associated with the VRF table; and
transmit the tagged route to a route reflector.

16. The non-transitory CRM of claim 10,
wherein the new route is received from a route reflector,
wherein the new route specifies a route target,
wherein the route target is associated with at least the VRF table, and
wherein the importing of the new route to at least the VRF table is based, at least in part, on the route target.

17. The system of claim 13, wherein the network element is further configured to:
update, on the network element, a local VRF policy using the first VRF policy to obtain an updated local VRF policy;
receive, by the network element, a new route; and
import, based on the updated local VRF policy, the new route to the VRF table.

18. The system of claim 17,
wherein the new route is received from a route reflector,
wherein the new route specifies a route target,
wherein the route target is associated with at least the VRF table, and
wherein the importing of the new route to at least the VRF table is based, at least in part, on the route target.

19. The system of claim 13, wherein the first VRF policy comprises at least one selected from a group consisting an import policy and an export policy.

20. The system of claim 13, wherein determining the application domain associated with the packet comprises performing packet inspection on the packet to determine an application executing on the computing device from which the packet was issued, wherein the application is associated with the application domain.

* * * * *

UNITED STATES PATENT AND TRADEMARK OFFICE
CERTIFICATE OF CORRECTION

PATENT NO. : 10,728,150 B2  
APPLICATION NO. : 15/943075  
DATED : July 28, 2020  
INVENTOR(S) : Devendra Raut Page 1 of 1

It is certified that error appears in the above-identified patent and that said Letters Patent is hereby corrected as shown below:

In the Claims

Column 11, Line 34, in Claim 3, the phrase "consisting an" should read -- consisting of an --.
Column 12, Line 41 in Claim 11, the phrase "consisting an" should read -- consisting of an --.
Column 14, Line 24 in Claim 19, the phrase "consisting an" should read -- consisting of an --.

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*